(12) United States Patent
Hsu

(10) Patent No.: US 7,574,301 B2
(45) Date of Patent: Aug. 11, 2009

(54) GLOBAL POSITIONING SYSTEM RECEIVER AND CORRELATING CIRCUIT THEREOF

(75) Inventor: Chia-Chang Hsu, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 396 days.

(21) Appl. No.: 11/464,117

(22) Filed: Aug. 11, 2006

(65) Prior Publication Data

US 2006/0287823 A1 Dec. 21, 2006

Related U.S. Application Data

(62) Division of application No. 10/979,670, filed on Nov. 1, 2004, now Pat. No. 7,395,155.

(30) Foreign Application Priority Data

Nov. 5, 2003 (TW) .............................. 92130890 A

(51) Int. Cl.
*G01S 1/00* (2006.01)
*H04M 17/00* (2006.01)

(52) U.S. Cl. ............. 701/213; 342/357.05; 342/357.12; 370/335; 375/148; 375/149

(58) Field of Classification Search ................. 375/210; 342/357; *G01S 1/00; H04M 17/00*
See application file for complete search history.

(56) References Cited

U.S. PATENT DOCUMENTS

| | | | | |
|---|---|---|---|---|
| 4,451,916 A | * | 5/1984 | Casper et al. | 714/4 |
| 4,894,842 A | * | 1/1990 | Broekhoven et al. | 375/150 |
| 4,910,752 A | * | 3/1990 | Yester et al. | 375/316 |
| 4,998,111 A | * | 3/1991 | Ma et al. | 342/352 |
| 5,329,549 A | * | 7/1994 | Kawasaki | 375/150 |
| 5,420,593 A | * | 5/1995 | Niles | 342/357.12 |
| 5,537,121 A | * | 7/1996 | Lennen | 342/357.12 |
| 6,118,808 A | * | 9/2000 | Tiemann et al. | 375/142 |

* cited by examiner

*Primary Examiner*—Tuan C To
(74) *Attorney, Agent, or Firm*—J.C. Patents

(57) ABSTRACT

A global positioning System receiver and a correlating circuit thereof are disclosed. They sequentially and in parallel generate the portion of bits of the C/A code representing the satellite, sequentially and in parallel generate the portion of bits of the corrected frequency code of Doppler effect, and sequentially outputs the portion of bits of the C/A code and the corrected frequency code therefrom for multiplying the data and the IF data and for adding the multiplications therefrom for generating the total addition values.

9 Claims, 6 Drawing Sheets

GLOBAL POSITIONING SYSTEM RECEIVER AND CORRELATING CIRCUIT THEREOF

CROSS-REFERENCE TO RELATED APPLICATION

This application is a divisional application of and claims the priority benefit of, U.S. application Ser. No 10/979,670 filed on Nov. 01, 2004, now U.S. Pat. No. 7,395,155 which claims the priority benefit of Taiwan application Ser. no. 92130890, filed on Nov. 5, 2003.

BACKGROUND OF THE INVENTION

1. Field of the Invention

The present invention relates to a communication apparatus, and more particularly to a Global Positioning System (GPS) receiver and a correlating circuit thereof.

2. Description of the Related Art

With the rapid advancement of technology, electronic devices are being widely used in our daily life. As to a global positioning System (GPS) receiver, it becomes more and more available to use to public. For example, the navigation system installed in cars can help the drivers identify the location and direction thereof that can substantially prevent the car from being lost.

FIG. 1 is a schematic drawing of a signal frame transmitted from a satellite. The A serial represents that the satellite transmits a frame for each 30 seconds which includes 5 sub-frames and each sub-frame with 6 seconds. The B serial represents that the frame data includes the 50 bits/sec navigation data. It means that the transmission time for each bit of the navigation data is 20 ms. Prior to transmission of the navigation data and the C/A code for identifying the satellite of the C serial are performed through exclusive or logic operation for generating the D serial data. The frequency of the C/A code is 1.023 MHz which transmits 1023 bits C/A code per ms. The length of the C/A code is 1023 bits. During the transmission the data are carried by a 1575.42 MHz carrying wave for performing bi-phase shift key (BPSK) by the output from the operation of the navigation data and the C/A code as shown E serial. The modulated signals are then transmitted.

For a GPS receiver, a RF front end serves for receiving the modulated signals for the IF data, and a correlating circuit serves for searching the C/A code for identifying the satellite whose data can be received. To date, 24 satellites are orbited on six orbits. Generally, three or four satellites are sufficient to identify the location. The more the satellites are, the more precise the location will be. In addition, because of the Doppler effect, the correlating circuit refers a corrected frequency code when searching the C/A code. If the IF data received by the correlating circuit is the IF data, and the C/A code for searching the satellite is Code, and the corrected frequency code is Doppler, the correlating circuit can determine the maximum for identifying the C/A code offset and Doppler corrected frequency of the satellite whose data can be received can be expressed by the following equation:

$$\sum_{0}^{Nms} IF * Doppler * Code \qquad (1)$$

The "*" represents a multiple operation, such as exclusive or logic operation, or a multiple of a single bit. "N ms" means the time period of receiving the data, which is adjustable. When the time period increases, the S/N ratio also increases which means the noise does not seriously affect. Following is a C/A code searching example, wherein the length of the C/A code is 7 bits. (Generally, the length of the C/A code is 1023 bits.)

Referring to FIG. 2, a schematic drawing of a circuit generating the 7-bit C/A code is shown. The circuit comprises a 3-bit shift register 210 and a multiplier 220. The input of the multiplier 220 is a two-bit output of the shift register 210; the output of the multiplier 220 is inputted into the shift register 210 responding to the output of the two bits. Therefore, the circuit, therefore, generates a 7-bit cycle C/A code, i.e. 1110010.

In order to search the 7-bit C/A code and determine the offset of the IF data, the correlating circuit of the GPS receiver uses the 7-bit C/A code, i.e., 1110010, and the other codes with different offset, such as 0111001, 1011100, 0101110, 0010111, 1100101, etc, to perform multiplication and addition with the IF data. The multiplication is, for example, the exclusive or logic operation shown in formula (1). If the C/A code has two-bit offset, the codes with different offset are, for example, 1110010, 0101110, 1011100, 0101110, 1001011, 1100101, etc. After the exclusive or logic operation and the addition operation, only "1011100" has a value "0"; the others have a value "4". If "4" is deemed as the zero point of the coordinate, "0" becomes "−4" in the coordinate. After the square and radical operation, it generates the maximum "4" which can be detected by a peak detector.

Referring to FIG. 3, a waveform of a searching result of a correlating circuit is shown. In addition to the offset of the C/A code, the correlating circuit also searches the Doppler corrected frequency. The offset of the C/A code and the Doppler corrected frequency with the maximum are tracked by the satellite for acquiring the correct offset of the C/A code and the Doppler corrected frequency.

FIG. 4 is a schematic block diagram of a prior art correlating circuit. The correlating circuit includes a C/A code register 405, a Doppler corrected frequency code register 410, an I memory 415, a Q memory 420, a Doppler multiplier 425, a C/A code multiplier 430, an I analogic adder 435, a Q analogic adder 440, an I A/D converter 445, a Q A/D converter 450, a square and radical calculator 445, an integrator 460 and a peak detector 465.

The C/A code register 405 serves for storing the C/A codes to be searched. The Doppler corrected frequency code register 410 serves for storing the Doppler corrected frequency code to be searched. The I memory 415 stores the IF data received by the RF front end. The Q memory 420 stores the IF data with 90° phase shift. The I memory 415 and the Q memory 420 can store the IF data for about 20 ms for the multiplication of formula (1). The data are being processed by the Doppler multiplier 425 and the C/A code multiplier 430 for generating the multiplication of each bit. After the process of the I analogic adder 435 and the Q analogic adder 440, the addition of the multiplication of each bit is acquired. After the process of the I A/D converter 445 and the Q A/D converter 450, the digital data are acquired.

Then, after the process of the square and radical calculator 445, the absolute values of the digital data are generated. By the integration of the integrator 460, the value is then stored in the non-coherent memory 470. It can reduce the noise influence. The longer the integration time, the higher the S/N ratio. It means the noise influence is reduced. The integrated value can be detected by the peak detector 465 for acquiring correct offset of the C/A code and the Doppler corrected frequency.

The prior art correlating circuit is also disclosed in U.S. Pat. Nos. 5,896,304 and 6,009,118. The correlating circuit uses analogic adders for generating the addition of the multiplication of each bit and the total addition of the multiplication of the 1023-bit C/A code. When the process is changed, the A/D converters should be redesigned. Therefore, the process portability is degraded.

Additionally, although the correlating circuit disclosed in U.S. Pat. No. 6,383,046 can improve the process portability, it processes the C/A code bits sequentially and then in parallel and does not have the buffer of the IF data. Therefore, it cannot perform the operation in parallel.

SUMMARY OF THE INVENTION

Therefore, the present invention discloses a global positioning System (GPS) receiver and a correlating circuit thereof, which sequentially and in parallel generates the portion of bits of the C/A code representing the satellite, sequentially generates the portion of bits of the corrected frequency code of Doppler effect, and sequentially outputs the portion of bits of the corrected frequency code therefrom for multiplying the data and the IF data and for adding the multiplications therefrom for generating the total addition value. Therefore, the correlating circuit having portable process is formed. In addition, the C/A code generating unit and the Doppler generating unit can generate a plurality of bits in parallel. It also includes the data receiving register for temporarily storing the IF data. A better parallel processing is performed.

In order to achieve the objects described above, the present invention provides a GPS receiver, which comprises: a RF front end, a data receiving register, a correlating circuit, a data extractor and a navigation processor. The RF front-end is adapted to receive, demodulate and sample a RF signal for generating an IF data. The data receiving register is coupled to the RF front end and adapted to store the IF data therefrom. The correlating circuit is coupled to the data receiving register and adapted to receive the IF data for sequentially and in parallel generating a portion of bits of a C/A code representing a satellite and a portion of bits of a corrected frequency code of Doppler effect, then sequentially multiplying the portion of bits of the C/A code from the C/A code generating unit, the portion of bits of the corrected frequency code from the parallel Doppler generating unit, and the IF data, adding multiplications therefrom for generating a total addition value and searching a maximum thereof for identifying the satellite transmitting the IF data. The data extractor is coupled to the correlating circuit and adapted to extract a navigation data from the IF data. The navigation processor is coupled to the data extractor and adapted to receive the navigation data for generating a longitude-latitude data and a standard time data.

In the preferred embodiment of the present invention, the correlating circuit of the GPS receiver comprises: a C/A code generating unit, a Doppler generating unit, a multiplication unit and digital addition and peak detector. The parallel C/A code generating unit sequentially and in parallel generates the portion of bits of the C/A code representing the satellite. The parallel Doppler generating unit, sequentially and in parallel generates the portion of bits of the corrected frequency code of Doppler effect and sequentially outputs the portion of bits of the corrected frequency code therefrom. The multiplication unit is coupled to the C/A code generating unit and to the Doppler generating unit, sequentially multiplying the portion of bits of the C/A code from the C/A code generating unit, the portion of bits of the corrected frequency code from the parallel Doppler generating unit, and the IF data. The digital addition and peak detector is coupled to the multiplication unit, adding the multiplications therefrom for generating the total addition value and searching the maximum thereof for identifying the satellite transmitting the IF data.

In an embodiment of the present invention, the C/A code generating unit comprises a C/A code phase loop controller adapted to sequentially output the portion of bits of the C/A code. The Doppler generating unit comprises a Doppler frequency loop controller adapted to sequentially output the portion of bits of the corrected frequency code.

In an embodiment of the present invention, the digital addition and peak detector comprises: a digital adder, a square and radical calculator, an integrator, and a peak detector. The digital adder is coupled to the multiplication generating unit and adapted to adding the multiplications therefrom for generating an I addition and a Q addition. The square and radical calculator is coupled to the digital adder and adapted to receive the I and Q additions and generating a square value and a radical value thereof. The integrator is coupled to the square and radical calculator and adapted to integrate an output therefrom during a period of time. The peak detector is coupled to the integrator and adapted to search a maximum of the I and Q additions for identifying the satellite transmitting the IF data.

In an embodiment of the present invention, the time period for addition is adjustable.

In an embodiment of the present invention, the multiplication unit can multiply 31, 32, 33, 61, 64, 66, 128, or more bits each time.

In an embodiment of the present invention, the data receiving register can store the IF data for about 20 ms.

In an embodiment of the present invention, the GPS receiver further comprises N correlating circuits, which have a structure similar to that of the correlating circuit, wherein N is 12. Each correlating circuit searches the data of two satellites and tracks the data of a satellite for enhancing the searching speed.

Accordingly, the present invention sequentially and in parallel generates the portion of bits of the C/A code representing the satellite, sequentially generates the portion of bits of the corrected frequency code of Doppler effect, and sequentially outputs the portion of bits of the corrected frequency code therefrom for multiplying the data and the IF data and for adding the multiplications therefrom for generating the total addition value. Therefore, the correlating circuit having portable process is formed and applied to a GPS receiver. In addition, the data receiving register temporarily stores the IF data for about 20 ms. A better parallel processing is therefore performed.

In order to make the aforementioned and other objects, features and advantages of the present invention understandable, a preferred embodiment accompanied with figures is described in detail below.

DESCRIPTION OF SOME EMBODIMENTS

Figure 1:
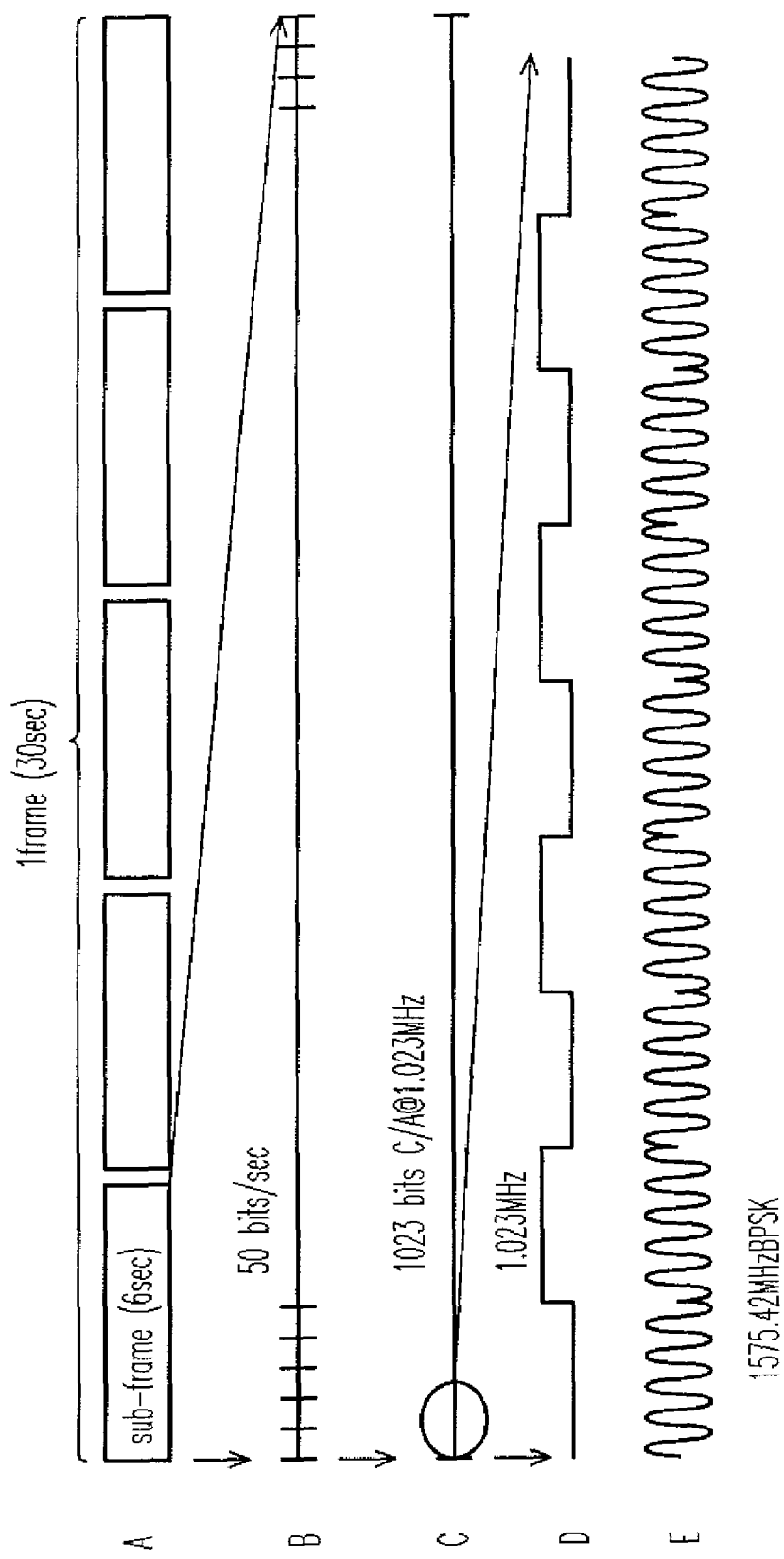
FIG. 1 is a schematic drawing of a signal frame transmitted from a satellite.
Figure 2:
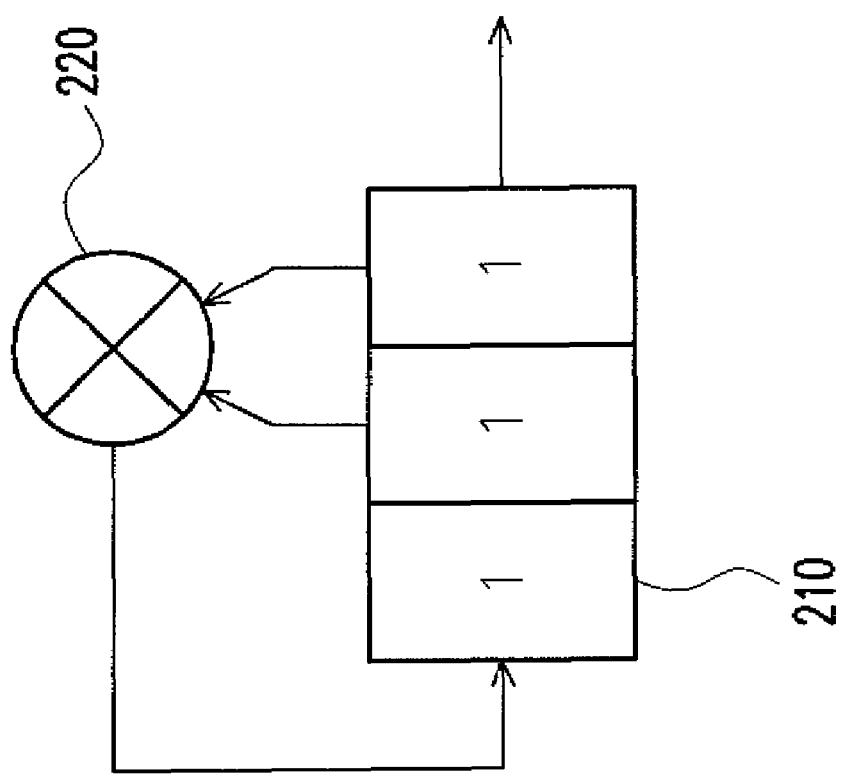
FIG. 2 is a schematic drawing of a circuit generating the 7-bit C/A code.
Figure 3:
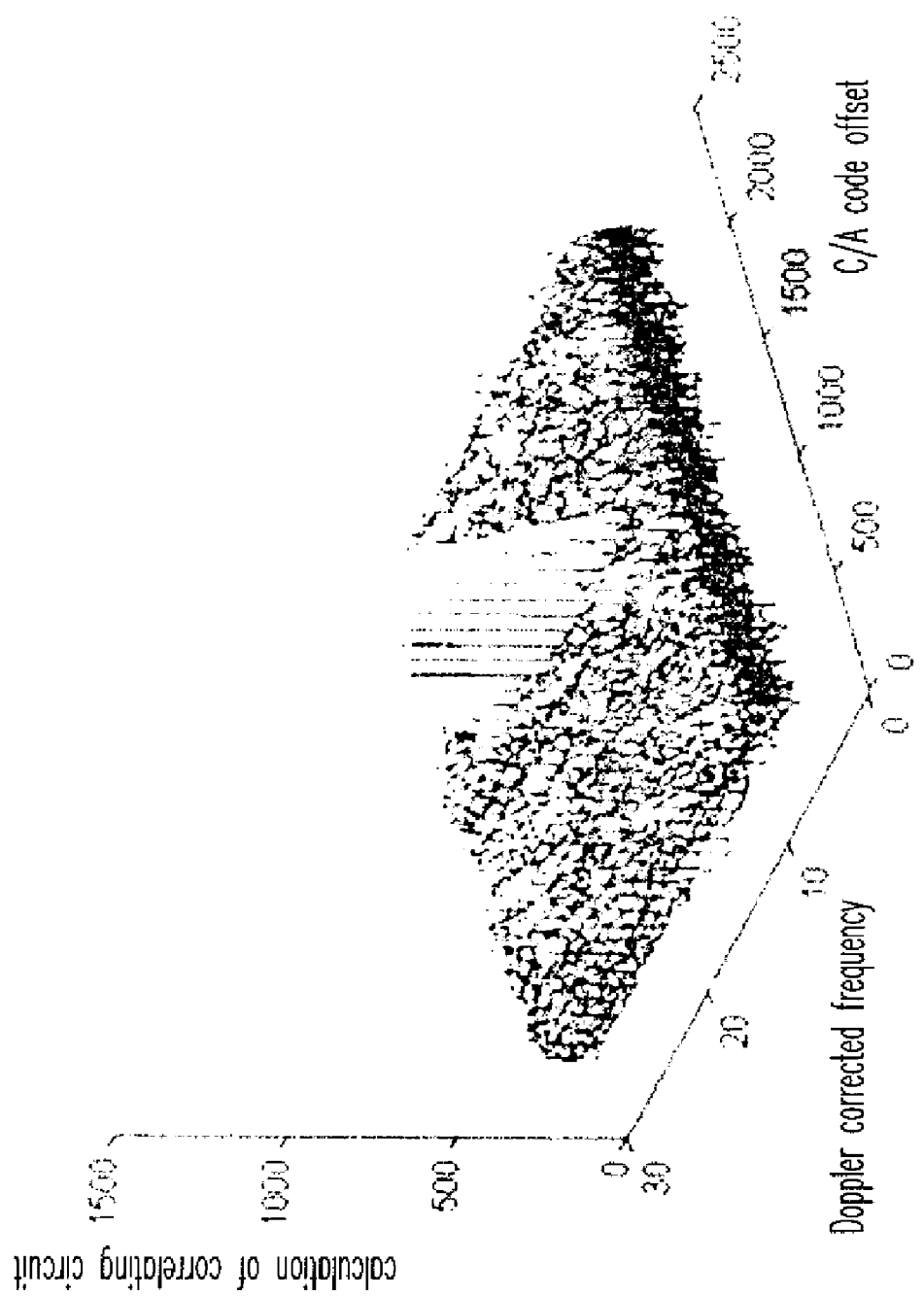
FIG. 3 is a waveform of a searching result of a correlating circuit.
Figure 4:
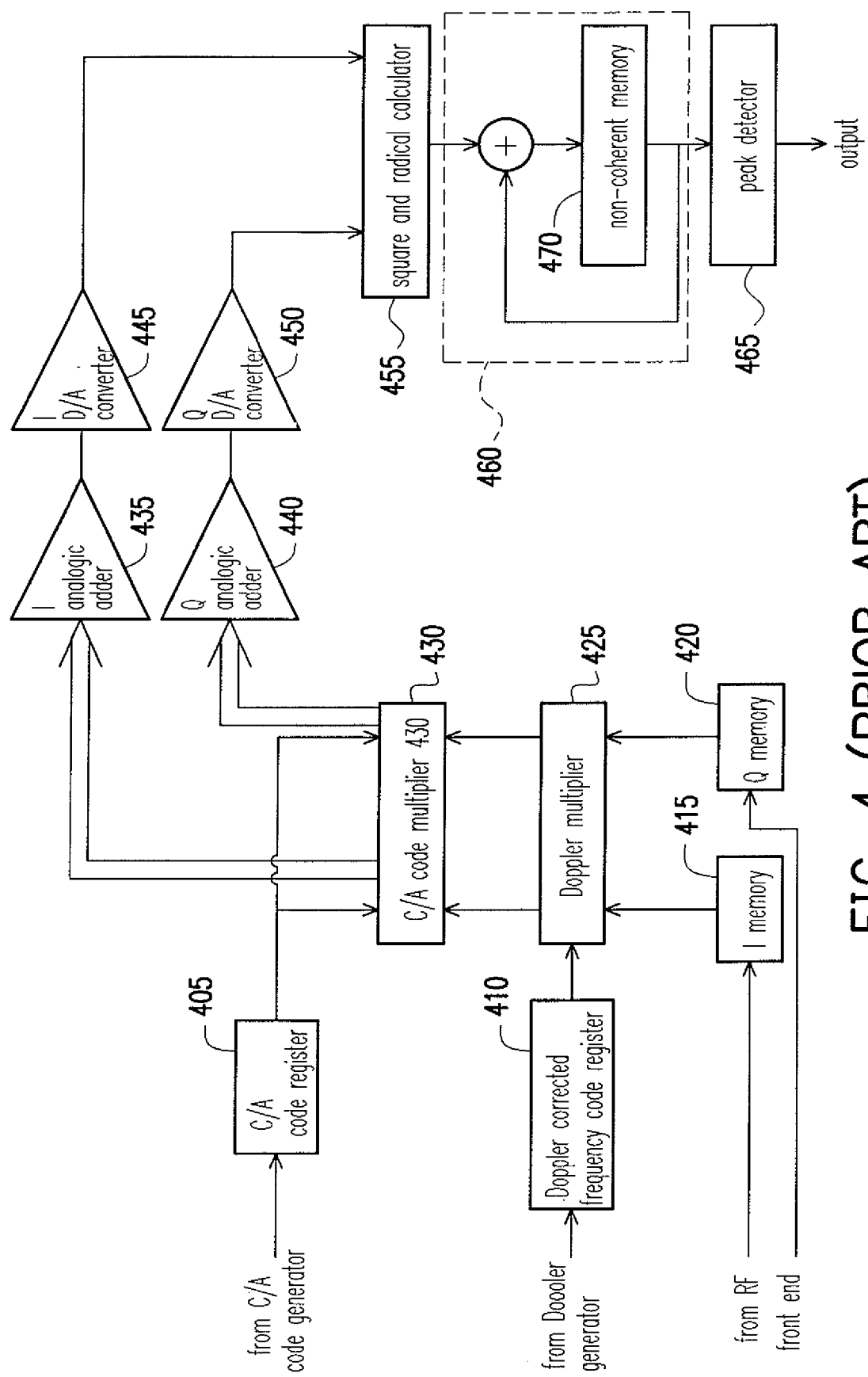
FIG. 4 is a schematic block diagram of a prior art correlating circuit.
Figure 5:
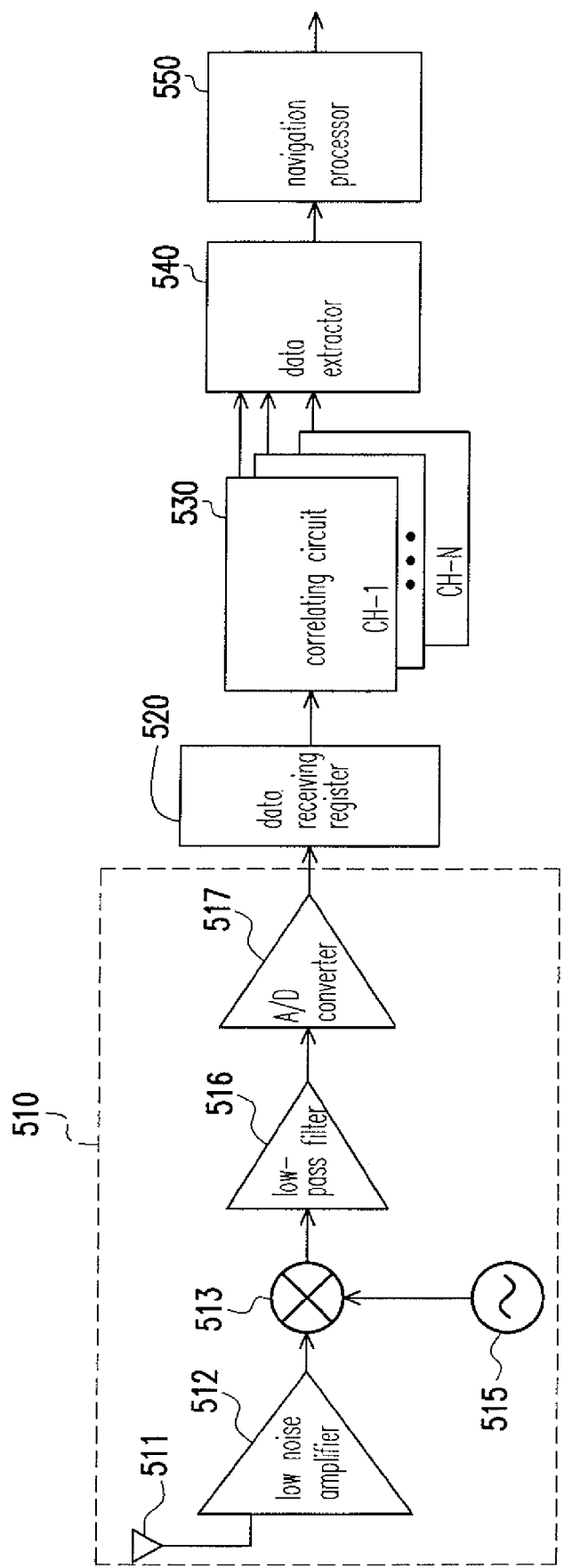
FIG. 5 is a schematic block diagram showing a global positioning System (GPS) receiver according to a preferred embodiment of the present invention.

FIG. 5 is a schematic block diagram showing a global positioning System (GPS) receiver according to a preferred embodiment of the present invention. The GPS receiver 500 comprises: a radio frequency (RF) front end 510, a data receiving register 520, a correlating circuit 530, a data extractor 540 and a navigation processor 550. The RF front end 510 is composed of an antenna 511, a low noise amplifier 512, a mixer 513, a local oscillator 515, a low-pass filter 516 and a A/D converter 517.

The antenna 511 is adapted to receive RF signals from satellites. The low noise amplifier 512 amplifies the RF signals, which are demodulated by the mixer 513, the local oscillator 515 and the low-pass filter 516 for receiving the base-frequency signals therein. The A/D converter 517 samples the signals for generating IF signals. The IF data generated with N time of the C/A code transmission frequency, wherein N is an integer. For example, the frequency is 1.023 MHz and N is 1; 1023 IF data can be acquired during 1 ms. The IF data can be stored in the data receiving register 520. In order to reduce the effect of noise during receiving data, following the formula (1), the data receiving register 520 can store the IF data for 20 ms if the correlating circuit calculating the IF data with 20 ms.

The correlating circuit 530 receives the IF data from the data receiving register 520, sequentially and in parallel generates a portion of bits of a C/A code representing the satellite, and sequentially generates a portion of bits of a corrected frequency code of Doppler effect for sequentially multiplying the portion of bits of the C/A code from the C/A code generating unit, the portion of bits of the corrected frequency code from the parallel Doppler generating unit, and the IF data, adding multiplications therefrom for generating a total addition value and searching a maximum thereof for identifying the satellite transmitting the IF data. The calculating circuit is described below.

In order to enhance the searching speed, the GPS receiver further comprises N correlating circuits, which have a structure similar to that of the correlating circuit, wherein N is preferably 12 for searching and tracking the data of 1-2 satellites.

The data extractor 540 is coupled to the correlating circuit 530 and adapted to extract a navigation data from the IF data. The navigation processor 550 is coupled to the data extractor 540 and adapted to receive the navigation data for generating a longitude-latitude data and a standard time data which can be transmitted to a computer having, for example, geographic information system (GIS), for providing geographic information of the user, such as location and direction.

Figure 6:
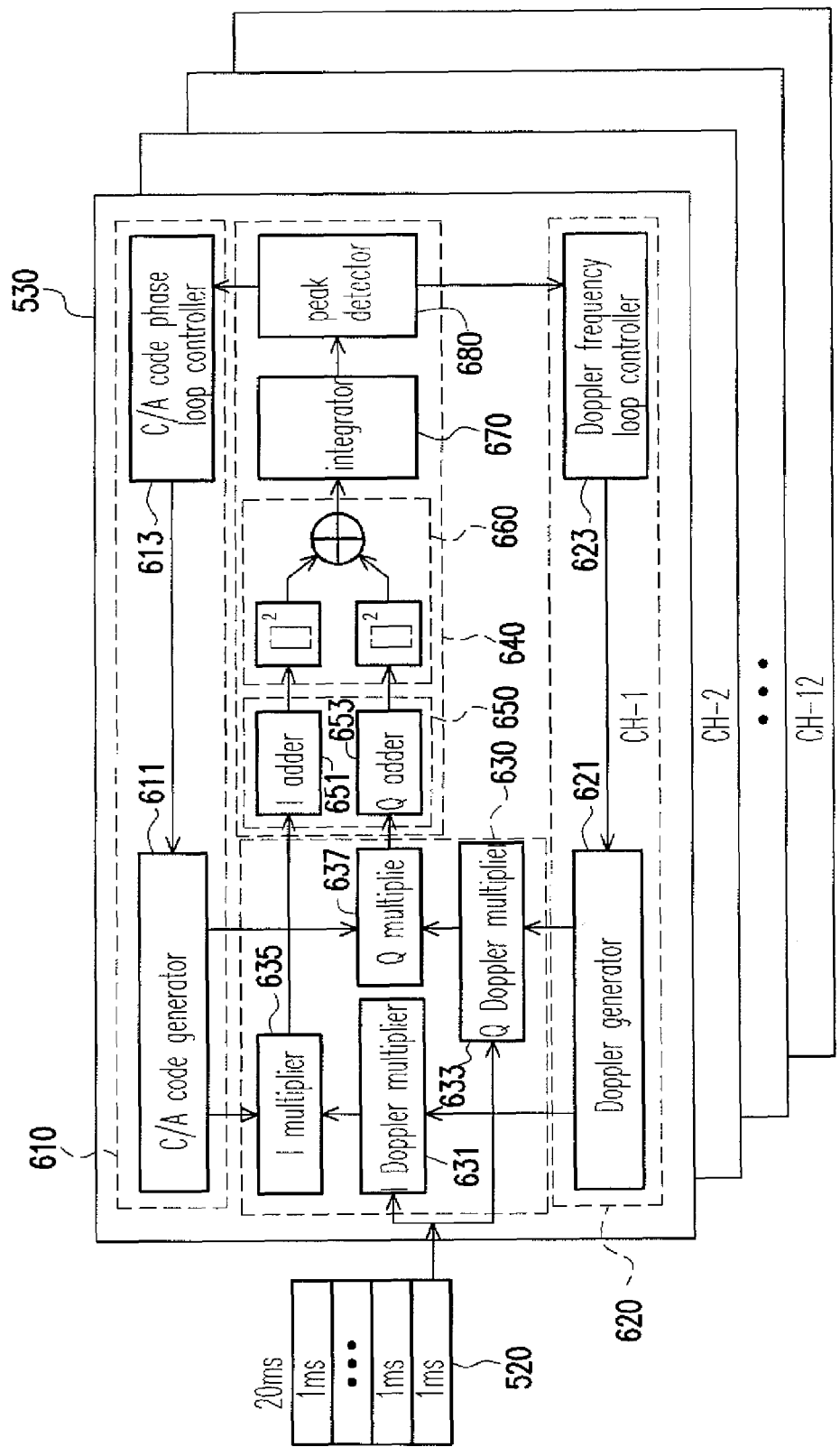
FIG. 6 is a schematic block diagram showing a correlating circuit according to a preferred embodiment of the present invention.

FIG. 6 is a schematic block diagram showing a correlating circuit according to a preferred embodiment of the present invention. The correlating circuit 530 of the GPS receiver comprises: a C/A code generating unit 610, a Doppler generating unit 620, a multiplication unit 630, and digital addition and peak detector 640. The C/A code generating unit 610 comprises a C/A code generator 611 and a C/A code phase loop controller 613. The Doppler generating unit 620 comprises a Doppler generator 621 and a Doppler frequency loop controller 623. The multiplication unit 630 comprises an I Doppler multiplier 631, a Q Doppler multiplier 633, an I multiplier 635 and Q multiplier 637. The addition and peak detector 640 comprises a digital adder 650 having an I adder 651 and a Q adder 653, a square and radical calculator 660, an integrator 670 and a peak detector 680.

The IF data transmitted from the RF front end 510 are stored in the data receiving register 520 as shown in FIG. 5 for multiplication with the C/A code or the C/A code having different offset and the Doppler corrected frequency code as shown in formula (1). The C/A code generator 611 controlled by the C/A code phase loop controller 613 generates and outputs a portion of bits of the C/A code and the C/A code having different offset representing different satellites in parallel. For example, in the C/A code with 1023 bits, it can generate and output 64 bits for 32 times.

Similarly, the Doppler generator 621 controlled by the Doppler frequency loop controller 623 generates and outputs the portion of bits of the corrected frequency code in parallel. For example, in the corrected frequency code with 1023 bits, it can generate and output 64 bits for 32 times. The corrected frequency code includes, for example, I and Q corrected frequency codes. The phase angle difference of the I and Q corrected frequency codes is 90° for correcting phase error during the sampling.

The I Doppler multiplier 631 and the Q Doppler multiplier 633 receive the I and Q corrected frequency codes generated from the Doppler generator 621 which are multiplied with the IF data from the data receiving register 520. The I multiplier 635 and the Q multiplier 637 receive the output form the I Doppler multiplier 631 and the Q Doppler multiplier 633 which are multiplied with the C/A code generated from the C/A code generator 611. The multiplications are outputted to the I adder 651 and the Q adder 653.

The I adder 651 and a Q adder 653 receive the multiplications from the I multiplier 635 and the Q multiplier 637 for generating the total value of each output bits. For example, in the multiplication with 64 bits, each of the I adder 651 and the Q adder 653 outputs the I addition and Q addition with 1023 bits after 32 multiplications.

The I and Q additions are outputted to the square and radical calculator 660 for square and addition operation and then radical operation thereof. The integrator 670 serves to integrate the values generated therefrom for 1-20 ms.

Finally, the peak detector 680 search the maximum among the IF data, the C/A code and the C/A code having different offset generated from the C/A code generator 611, and the corrected frequency code generated form the Doppler generator 621 for identifying the satellite transmits the IF data. For example, if there are 24 satellites, there are 1023 C/A codes with different offset due to the C/A code having 1023 bits and there are 20 corrected frequency codes, the peak detector 680 searching whether the satellites have the peak and identify the satellite during the 24×1023×20 multiplications. Of course, one of ordinary skill in the art perceives that the multiplications vary with the number of the sample data.

Accordingly, the present invention has following advantages:

1. The present invention sequentially and in parallel generates the portion of bits of the C/A code representing the satellite, sequentially and in parallel generates the portion of bits of the corrected frequency code of Doppler effect, and sequentially outputs the portion of bits of the corrected frequency code therefrom for multiplying the data and the IF data and for adding the multiplications therefrom for generating the total addition value. Therefore, the digital calculating circuit can be simplified and the performance thereof is improved.

2. The present invention provides the correlating circuit and the GPS receiver thereof without including analogic adders, and therefore the correlating circuit and the GPS receiver thereof can be easily fabricated using the semiconductor process.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A Global Positioning System (GPS) receiver, comprising:

a RF front end, configured to receive, demodulate and sample a RF signal for generating a IF data;

a data receiving register, coupled to the RF front end, configured to store the IF data therefrom;

a correlating circuit, coupled to the data receiving register, configured to receive the IF data for sequentially and in parallel generating a portion of bits of a C/A code representing a satellite and a portion of bits of a corrected frequency code of Doppler effect, then sequentially multiplying the portion of bits of the C/A code, the portion of bits of the corrected frequency code, and the IF data, and including a digital addition and peak detector for adding multiplications therefrom for generating a total addition value and searching a maximum thereof for identifying the satellite transmitting the IF data, wherein the digital addition and peak detector includes:

a digital adder, configured to add the multiplications therefrom for generating an I addition and a Q addition;

a square and radical calculator, coupled to the digital adder, configured to receive the I and Q additions and generating a square, addition and radical value thereof;

an integrator, coupled to the square and radical calculator, configured to integrate an output therefrom during a period of time; and a peak detector, coupled to the integrator, configured to search a maximum of the I and Q additions for identifying the satellite transmitting the IF data;

a data extractor, coupled to the correlating circuit, configured to extract a navigation data from the IF data; and a navigation processor, coupled to the data extractor, configured to receive the navigation data for generating a longitude-latitude data and a standard time data.

2. The GPS receiver of claim 1, wherein the correlating circuit comprises:

a parallel C/A code generating unit, sequentially and in parallel generating the portion of bits of the C/A code representing the satellite and sequentially outputting the portion of bits of the C/A code therefrom;

a parallel Doppler generating unit sequentially and in parallel generating the portion of bits of the corrected frequency code of Doppler effect and sequentially outputting the portion of bits of the corrected frequency code therefrom;

a multiplication unit, coupled to the C/A code generating unit and the Doppler generating unit, sequentially multiplying the portion of bits of the C/A code from the parallel C/A code generating unit, the portion of bits of the corrected frequency code from the parallel Doppler generating unit, and the IF data; and the digital addition and peak detector, coupled to the multiplication unit.

3. The GPS receiver of claim 2, wherein the parallel C/A code generating unit comprises a C/A code phase loop controller adapted to sequentially output the portion of bits of the C/A code.

4. The GPS receiver of claim 2, wherein the parallel Doppler generating unit comprises a Doppler frequency loop controller adapted to sequentially output the portion of bits of the corrected frequency code.

5. The GPS receiver of claim 1, wherein the period of time is adjustable.

6. The GPS receiver of claim 2, wherein the multiplication unit can multiply 31, 32, 33, 62, 64, 66, 128 or more bits each time.

7. The GPS receiver of claim 1, wherein the data receiving register can store the IF data for about 2 ms to 20 ms.

8. The GPS receiver of claim 1, further comprises N correlating circuits, which have a structure similar to that of the correlating circuit.

9. The GPS receiver of claim 8, wherein N is 8, 10, 12 or more.

* * * * *